United States Patent [19]

Schantz

[11] 4,406,384

[45] Sep. 27, 1983

[54] DETACHABLE LOAD CARRIER FOR A VEHICLE

[76] Inventor: Lawrence F. Schantz, 500 W. Navajo, Lake Quivira, Kans. 66106

[21] Appl. No.: 279,424

[22] Filed: Jul. 1, 1981

Related U.S. Application Data

[63] Continuation-in-part of Ser. No. 184,927, Sep. 8, 1980, abandoned.

[51] Int. Cl.³ .............................................. B60R 9/00
[52] U.S. Cl. ........................... 224/42.07; 224/42.03 R; 224/42.08
[58] Field of Search ................. 224/42.03 R, 42.03 A, 224/42.07, 42.08, 42.43, 42.44, 309, 310; 414/402, 405; 280/760, 769

[56] References Cited

U.S. PATENT DOCUMENTS

| | | |
|---|---|---|
| 2,054,800 | 9/1936 | Adams . |
| 2,338,955 | 1/1944 | Metcalf . |
| 2,409,103 | 10/1946 | Cameron . |
| 2,492,841 | 12/1949 | Burkey . |
| 2,573,187 | 10/1951 | Desilets ........................... 224/310 X |
| 2,777,625 | 1/1957 | Kronhaus et al. ................ 224/42.43 |
| 2,907,483 | 10/1959 | Prag . |
| 2,931,528 | 4/1960 | Mabry . |
| 3,161,973 | 12/1964 | Hastings . |
| 3,203,605 | 8/1965 | Karl . |
| 3,260,929 | 7/1966 | Hedgepeth ....................... 224/42.07 |
| 3,531,006 | 9/1970 | Farchmin . |
| 3,724,694 | 4/1973 | Wilson .......................... 224/42.07 X |
| 3,902,641 | 9/1975 | Peasley . |
| 4,089,448 | 5/1978 | Traeger ................... 224/42.03 R X |
| 4,099,760 | 7/1978 | Mascotte et al. ............ 224/42.08 X |

Primary Examiner—Steven M. Pollard
Attorney, Agent, or Firm—Litman, Day & McMahon

[57] ABSTRACT

A detachable load carrier for automobile-type vehicles comprises a longitudinal member positioned substantially lengthwise of the vehicle and having a first portion and a second portion. A first connector is provided for detachably mounting the first portion of the longitudinal member to a surface of the vehicle. A rigid upright structure has an upper portion attached to the longitudinal member second portion and a lower portion with a second connector for detachably mounting the upright structure lower portion to one end of the vehicle. The second connector comprises a bracket with a strap for attaching it to a bumper of the vehicle. The strap includes an end attachable to either the bracket or a free edge of the bumper. A platform is attached to the upright structure lower portion and is movable from an extended position with respect to the upright structure for supporting a load thereon to a retracted position adjacent and substantially parallel with the upright structure. Support means is provided to prevent the platform in its extended position from moving downwardly with respect to the upright structure.

15 Claims, 17 Drawing Figures

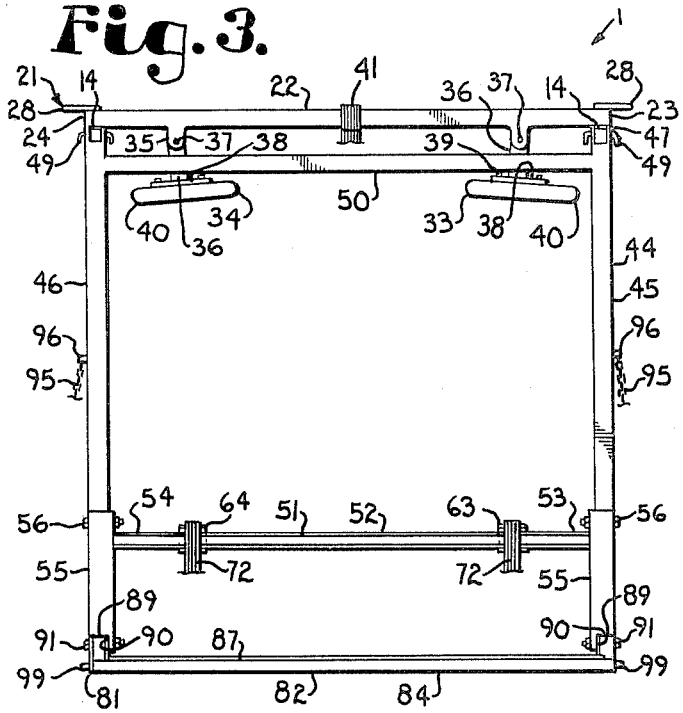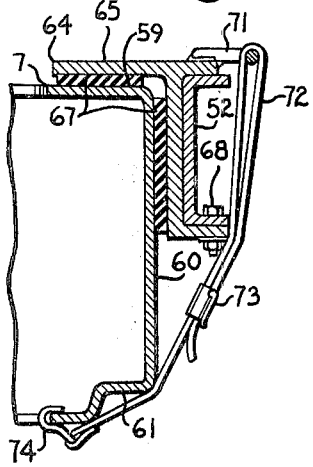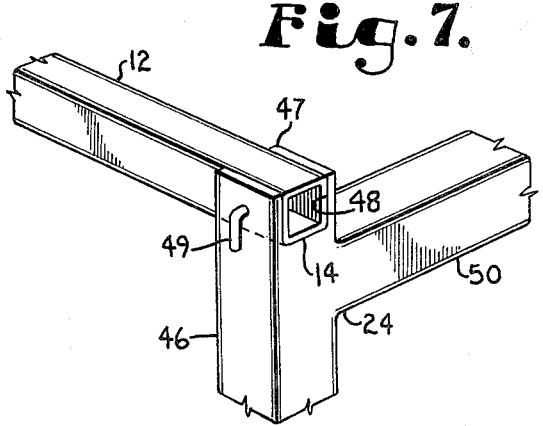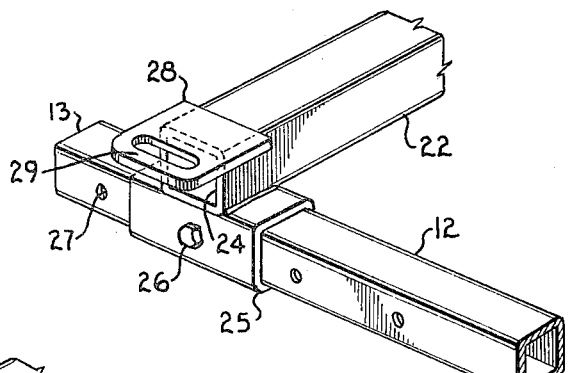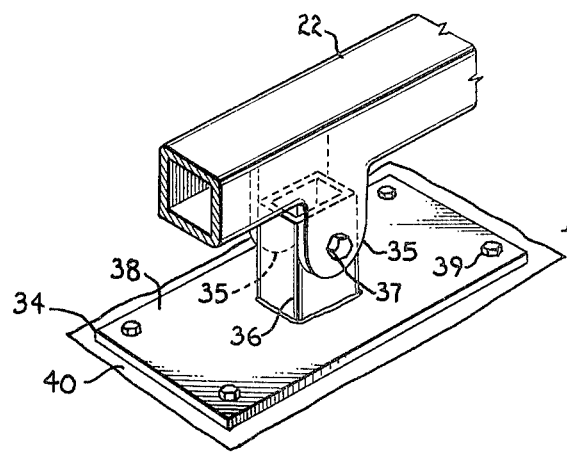

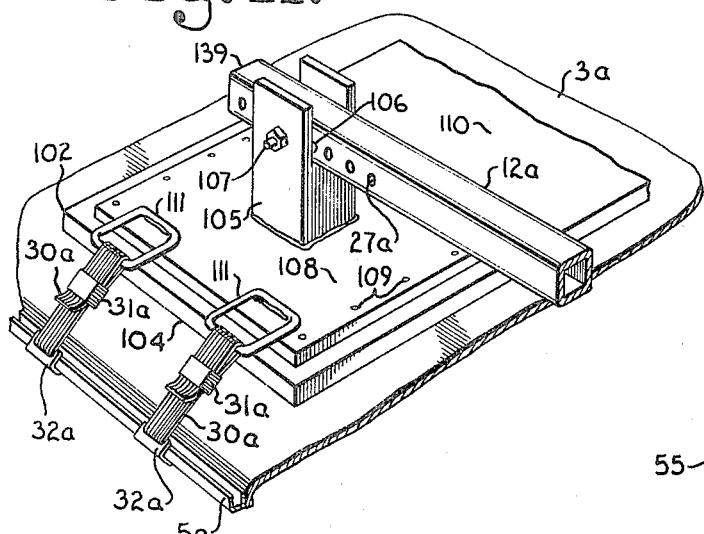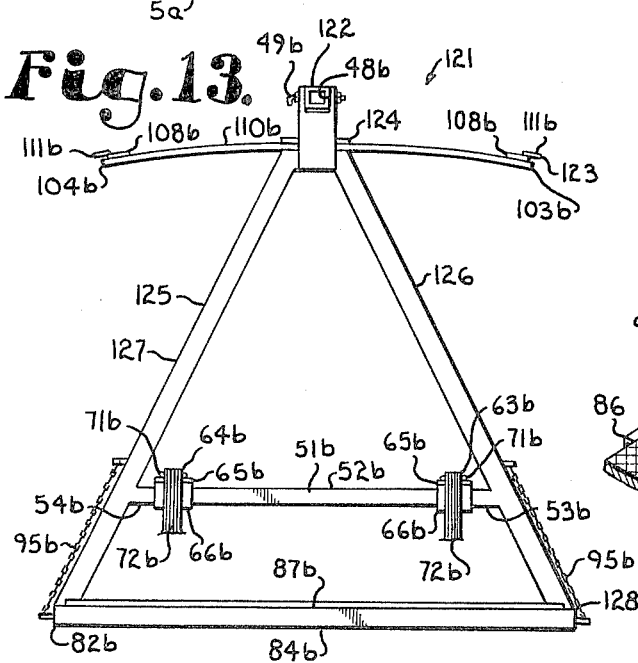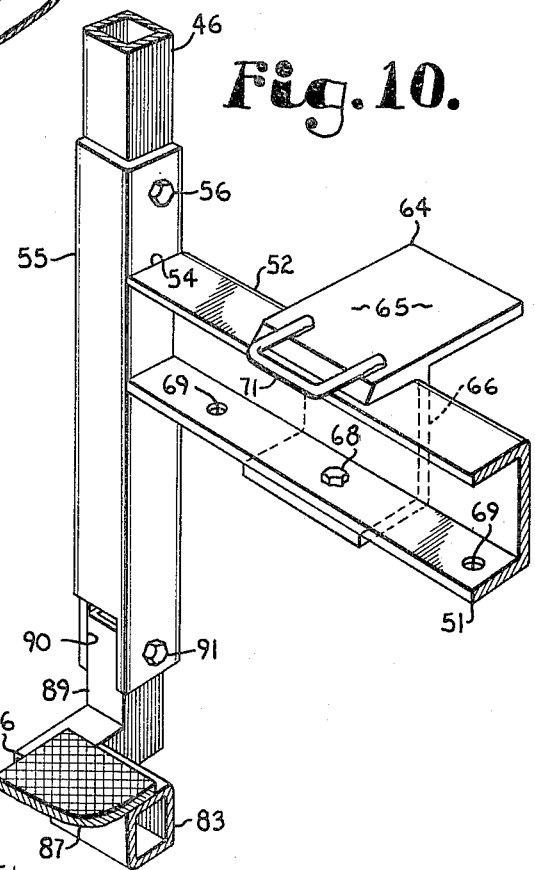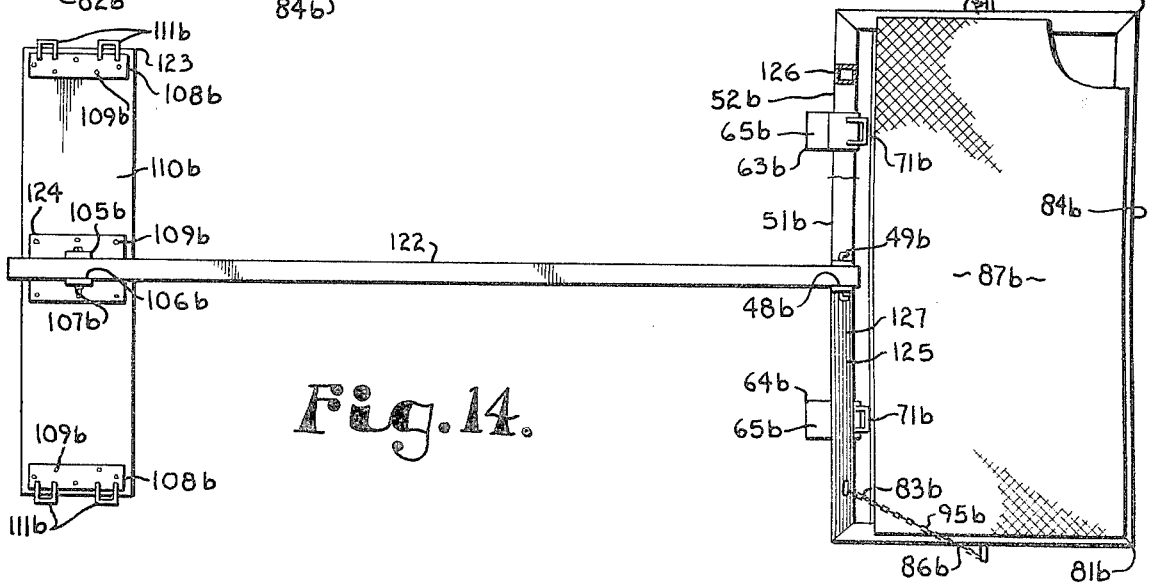

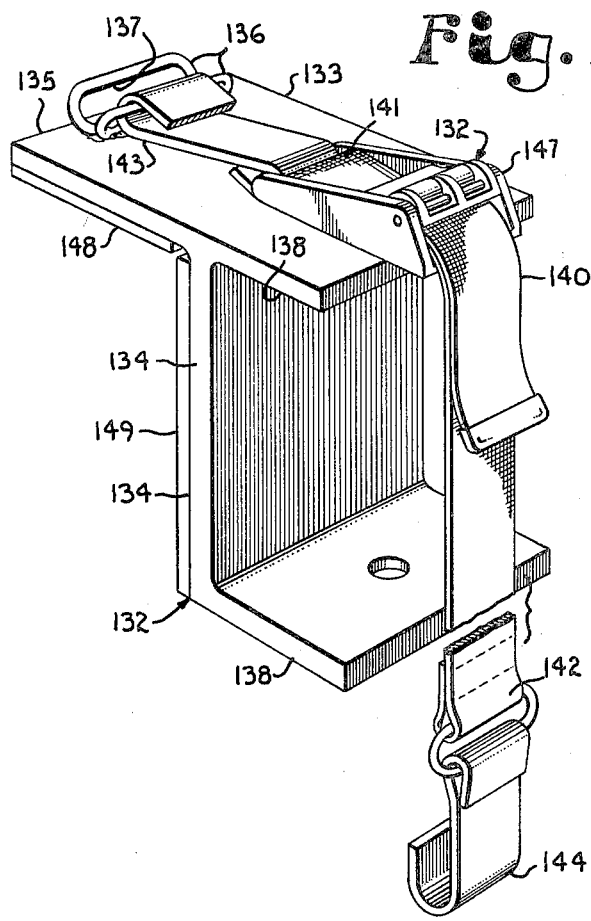
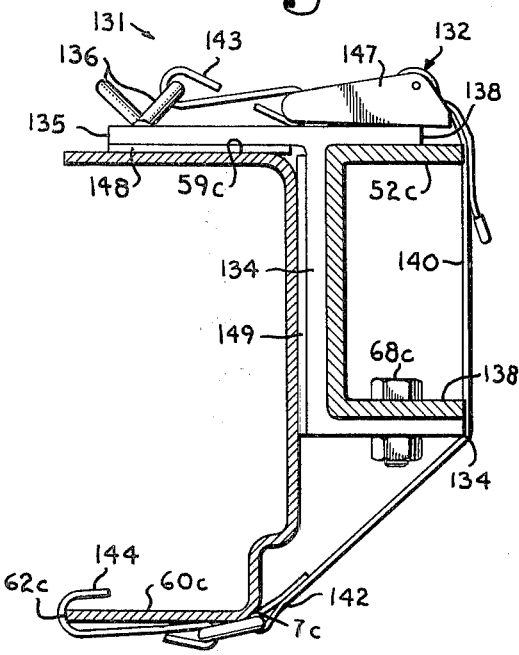
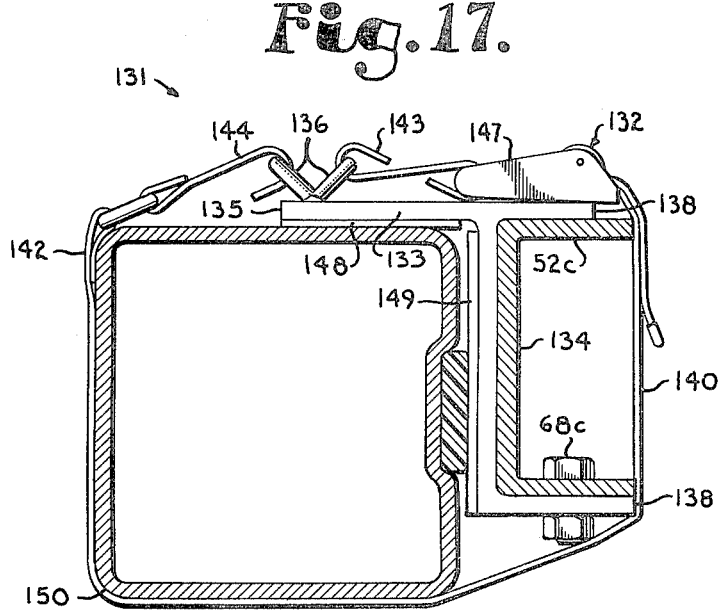

DETACHABLE LOAD CARRIER FOR A VEHICLE

CROSS REFERENCE TO RELATED APPLICATION

This is a continuation-in-part of Application Ser. No. 184,927, filed Sept. 8, 1980, entitled DETACHABLE AUTOMOBILE CARRIER, and now abandoned.

BACKGROUND OF THE INVENTION

This invention relates to load carriers for automobile-type vehicles, and in particular to a detachable load carrier.

A variety of load carriers have been developed for the purpose of enabling vehicles to accomodate large or heavy objects which would not fit within a vehicle's interior or trunk. The problem of carrying such loads is particularly common with small "compact" or "sub-compact" automobiles which are being produced by both the foreign and domestic manufacturers for their fuel efficiency but which often have minimal interior and trunk space. However, even if such spaces are adequate, they may be inconveniently positioned for receiving a heavy or bulky load. For example, the lifting motions associated with placing a heavy load in the trunk of a vehicle may place considerale strain on an individual and may even be injurious. Theerefore, it is desirable that a load carrier be capable of receiving large or heavy loads in a position as near to a ground surface as possible.

Automobile carriers are particularly useful in the operation of certain businesses which deal in large or heavy items which must be transported by the private automobiles of their customers. For example, retail rental establishments typically stock major appliances, powered lawn and garden equipment, building equipment and other large or heavy items which many customers would find impossible to place within their automobiles. Such a business may therefore increase its volume by providing its customers with a load carrier that is both easy to use and inexpensive. However, such a load carrier should be adapted to fit as many different types of vehicles as possible with only minor modifications.

Prior art load carriers include that shown in the Adams U.S. Pat. No. 2,054,800 which has bars which attach to and extend from the bumper of an automobile for supporting a load alongside of, in front of, or behind same. However, such a carrier is not readily adaptable to the bumper structures of many modern vehicles. Also, loads carried alongside an automobile in that manner increase the effective width thereof and pose a potential safety hazard. The Metcalf U.S. Pat. No. 2,338,955 shows a carrier with longitudinal members pivotally connected to the rear bumper of an automobile and a tail board extending therefrom. The structure is adapted to pivot about its bumper attachment and slide downwardly to rest on a ground surface. Such a device, however, is impractical for heavy loads because of the difficulties inherent with pivoting and sliding such a carrier. Also, the loads are carried in a tilted rather than an upright position. Cameron U.S. Pat. No. 2,409,103 also shows a carrier comprised of uprights and a foot board pivotable with respect to an automobile bumper. The carrier upper end is secured by a bearing bar and turnbuckle connectors. This apparatus is similarly unsuited for supporting a load in an upright position and would present attachment difficulties on modern automobiles with extended trunk structures.

"Car-top" type carriers for positioning a load above the roof or trunk of an automobile are also well known. However, they suffer from several disadvantages, including the height to which the load must be lifted, increased wind resistance to forward motion of the vehicle, and incompatability with many automobiles.

Prior art automobile carriers therefore have tended to be unsuitable for supporting large or heavy loads in an upright position near a ground surface and for convenient attachment to and removal from a variety of vehicles of different configurations. Also, some prior art load carriers tended to partially obscure the driver's vision to the rear and the taillights of the vehicle.

SUMMARY OF THE INVENTION

In the practice of the present invention, a detachable load carrier for automobile-type vehicles is provided which is easily adapted to fit a variety of different automobiles for carrying large or heavy loads in an upright position substantially lengthwise of the vehicle and has first and second portions. A first connector is attached to the longitudinal member first portion for detachably mounting the longitudinal member to the vehicle. A rigid upright structure has an upper portion attached to the longitudinal member second portion and a lower portion. A bracket is provided for detachably mounting the upright structure lower portion to a bumper of the vehicle. A load supporting platform is movable from an extended position with respect to the upright structure to a retracted position adjacent and substantially parallel with the upright structure. Support means is provided to prevent the platform in its extended position from moving downwardly with respect to the upright structure.

The principle objects of the present invention are: to provide a detachable load carrier for an automobile-type vehicle which conveniently carries relatively large and heavy loads; to provide such a load carrier which includes a longitudinal member which is adapted for supporting a load thereon above the vehicle; to provide such a load carrier which is easily removed from and attached to a variety of vehicles; to provide such a load carrier which is adaptable for use with relatively small vehicles; to provide such a load carrier which is convenient to place a load on or remove a load from; to provide such a load carrier which is adapted for supporting a load in a position whereby a driver's vision and taillights of the vehicle are not substantially obscured; to provide such a load carrier which does not impede access to a trunk of the vehicle; to provide such a load carrier which includes a vertical structure attached to one end of the vehicle with a load carrier platform extending therefrom; to provide such a load carrier wherein the platform is movable from an extended position for supporting a load thereon to a retracted position adjacent and substantially parallel with the upright structure; to provide such a load carrier with a connector for attaching the load carrier to a surface of the vehicle; to provide such a load carrier wherein the connector includes a flexible saddle structure with hold-down fasteners adapted for pressing the saddle structure against the vehicle surface; to provide such a load carrier with a second connector for detachably mounting the load carrier to a bumper of the vehicle; to provide such a load carrier wherein the second connector comprises a bracket adapted for attachment to a variety of vehicle bumpers; to provide such a load carrier wherein the bracket includes a strap with a first end attached thereto and a second end attachable either to the bracket or a free edge of the bumper; and to provide such a load carrier which is economical to manufacture, efficient in use, capable of a long operating life and particularly well adapted for its proposed use.

Other objects and advantages of this invention will become apparent from the following description taken in conjunction with the accompanying drawings wherein are set forth by way of illustration and example certain embodiments of this invention.

The drawings constitute a part of this specification and include exemplary embodiments of the present invention and illustrate various objects and features thereof.

BRIEF DESCRIPTION OF THE DRAWINGS

FIG. 3 is a rear elevational view of the load carrier.

FIG. 6 is an enlarged fragmentary vertical cross-sectional view of the load carrier taken along line 6—6 in FIG. 2 and particularly showing a connector for attaching the load carrier to a bumper of the automobile.

FIG. 7 is an enlarged fragmentary perspective view of the load carrier particularly showing the connection between a longitudinal member and the upright structure.

FIG. 8 is an enlarged fragmentary perspective view of the load carrier particularly showing the connection between a longitudinal member and the saddle structure.

FIG. 9 is an enlarged fragmentary perspective view of the load carrier particularly showing a support for engaging the roof of the automobile.

FIG. 10 is an enlarged fragmentary perspective view of the load carrier particularly showing a portion of a bumper attachment thereof.

FIG. 11 is an enlarged fragmentary perspective view of a first modified embodiment of a load carrier according to the present invention particularly showing an end of a saddle structure for attaching a longitudinal member to a roof of an automobile.

FIG. 13 is a rear elevational view of a second modified embodiment of a load carrier according to the present invention.

FIG. 14 is a top plan view of the second modified embodiment of the load carrier as shown in FIG. 13 with portions of a platform thereof broken away to reveal a frame construction thereof.

FIG. 15 is a fragmentary perspective view of a third modified embodiment of the present invention particularly showing an alternative bracket for attachment to a vehicle bumper.

FIG. 16 is a vertical, cross-sectional view of the load carrier as shown in FIG. 15, and particularly showing a strap partially surrounding a bumper and having ends connected to a bracket.

FIG. 17 is fragmentary, vertical, cross-sectional view of the load carrier as shown in FIG. 15, and particularly showing an end of the strap connected to a free edge of the bumper.

DETAILED DESCRIPTION OF THE PREFERRED EMBODIMENT

Figure 1:
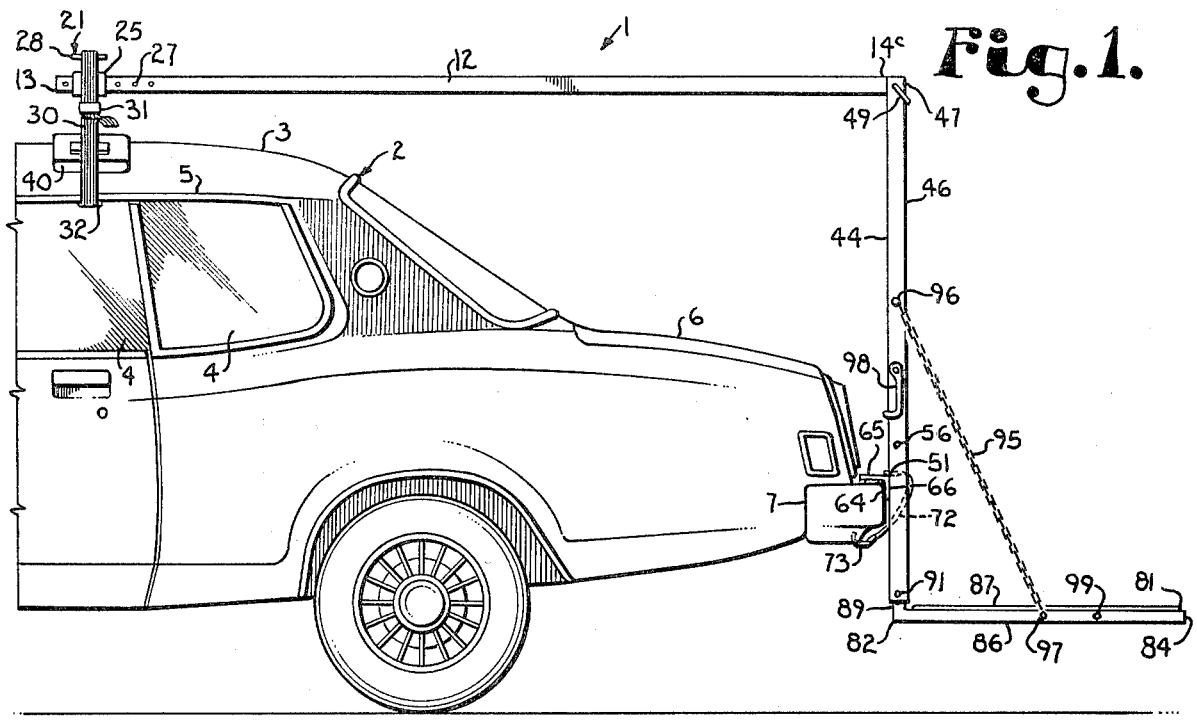
FIG. 1 is a side elevational view of a detachable load carrier embodying the present invention, shown attached to an automobile.

As required, detailed embodiments of the present invention are disclosed herein. However, it is to be understood that the disclosed embodiments are merely exemplary of the invention which may be embodied in various forms. Therefore, specific structural and functional details disclosed herein are not to interpreted as limiting but merely as a basis for the claims and as a representative basis for teaching one skilled in the art to variously employ the present invention in virtually any appropriately detailed structure.

The reference numeral 1 generally designates a detachable load carrier for a vehicle such as an automobile 2.

For purposes of description herein, the terms "upper", "lower", "rear", "front", "vertical", "horizontal", and derivatives thereof shall relate to the invention as oriented with respect to the automobile 2 in FIG. 1. The terms "right" and "left" and derivatives thereof shall relate to the invention as oriented in FIG. 3 with the viewer looking left from a position to the right of FIG. 1. However, it is to be understood that the invention may assume various alternative orientations, except where expressly specified to the contrary.

The automobile 2 includes a roof 3, side windows 4 with a rain gutter 5 thereabove, a trunk lid 6 and a rear bumper 7. The load carrier comprises right and left longitudinal members 11 and 12 respectively, each having a front and a rear end 13 and 14 respectively.

Figure 2:
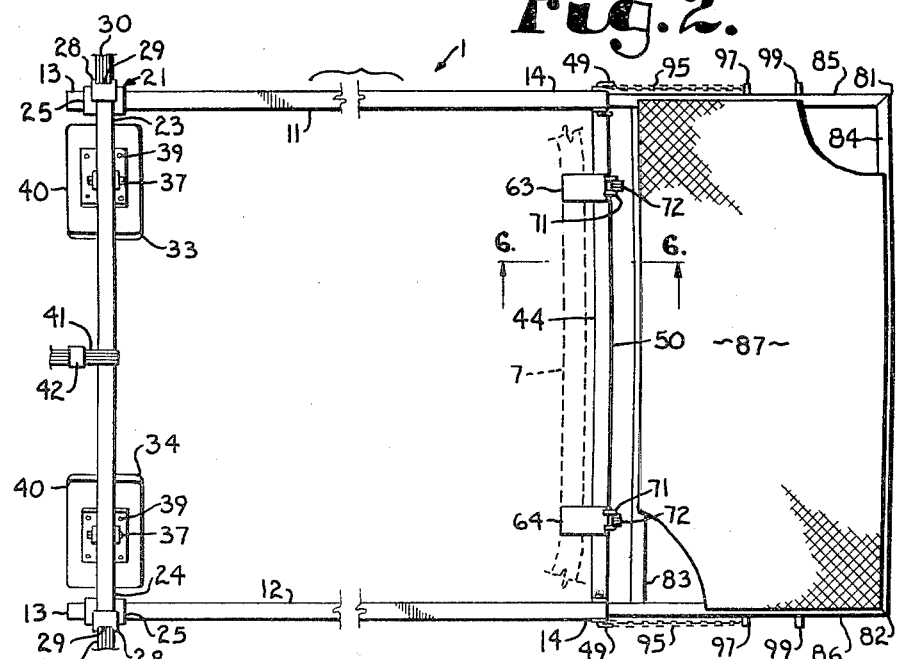
FIG. 2 is a partial plan view of the load carrier, with portions of the platform broken away to reveal the frame construction thereof.
Figure 4:
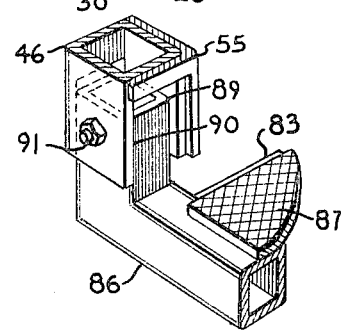
FIG. 4 is a fragmentary enlarged perspective view of a pivotal connection in the load carrier.

A saddle structure 21 is provided for attaching the longitudinal members 11 and 12 to the automobile roof 3 and includes a first transverse bar 22 having right and left ends 23 and 24 (FIG. 2). The first transverse bar ends 23 and 24 each have a sleeve 25 attached thereto which are slidably positioned over respective longitudinal members 11 and 12 near front ends 13 thereof (FIG. 8). The sleeves 25 are retained by bolts 26 each positioned within an aperture 27. A plurality of such apertures 27 are provided at spaced intervals along the longitudinal members 11 and 12 whereby the positioning of the saddle structure 21 with respect to the longitudinal members 11 and 12 may be adjusted to accommodate different sized vehicles. A protrusion 28 with a slot 29 extends outwardly from each end 23 and 24 of the first transverse bar 22 for receiving a hold-down strap 30 (FIGS. 1 and 2). Clamps 31 are provided for cinching each hold-down strap 30 tight. Hooks 32 are adapted for engaging the rain gutters 5 which may be found on either side of the roof 3 above the side windows 4 of many automobiles. On automobiles lacking such rain gutters the hooks 32 engage a top part of the door opening.

Depending from the first transverse bar 22 are two pairs of opposed ears 35 which support right and left roof engaging supports 33 and 34, each having a stud 36 rotatably secured between a respective pair of opposed ears 35 by a pivotal connector such as a bolt 37 (FIG. 9). Each stud 36 abuts a plate 38 in approximately the center thereof. Fasteners such as bolts 39 shown secure a pad 40 to each plate 38. The pads 4 are preferably formed of a resilient material for engaging the autmobile roof 3 in such a manner as to evenly distribute the downward forces associated with the saddle structure 21 over a sufficient area of the automobile roof 3 to avoid damage thereto. It is also preferable that the pads 40 be comprised of a material capable of forming a frictional cohesion with the automobile roof 3 to facilitate maintaining the saddle structure 21 in position and resist sliding with respect to the automobile roof 3. The saddle structure 21 may be further secured in position by employing a forward hold-down strap 41 looped over the first transverse bar 22 and secured to a front portion, for example a front bumper of the automobile 2 by a hook (not shown) and cinched tight by a clamp 42.

An upright structure 44 is preferably positioned substantially vertically behind the automobile rear bumper 7 and includes right and left tubes 45 and 46. Each tube displays a trunnion shaped upper end 47 with a notch 48. A pin connector 49 secures the rear end 14 of each respective longitudinal member to a respective tube upper end 47 (FIG. 7). A second transverse bar 50 connects the right and left tube upper ends 47.

The upright structure 44 is secured to the automobile rear bumper 7 by means of a bumper attachment 51 with a channel shaped transverse bumper attachment member 52 having right and left ends 53 and 54. Each end 53 and 54 abuts a mounting member 55 secured to the right and left tubes 45 and 46 respectively by bolts 56 (FIG. 10).

The automobile bumper 7 includes top, rear and bottom surfaces 59, 60 and 61 respectively as shown in cross-section in FIG. 6. The bumper bottom surface 61 includes a forward facing free edge 62. Right and left brackets 63 and 64 each display a top horizontal flange 65 and a rear L-shaped flange 6. Pads 67 are positioned between the top and rear flanges 65 and 66 and the top and rear bumper surfaces 59 and 60 respectively, for providing a resilient contact therebetween and preventing marring or other damage to the rear bumper 7. The right and left brackets 63 and 64 respectively are attached to the transverse member 52 by a connector such as the bolt 68 shown positioned within one of a plurality of apertures 69 in the transverse member 52 and an aligned aperture (not shown) in the rear bracket flange 66 (FIG. 10). The plurality of apertures 69 allow the right and left brackets 63 and 64 to be positioned at a plurality of corresponding positions with respect to the transverse member 52. The bumper attachment 51 may thereby be adjusted to accommodate a variety of vehicle bumpers of different configurations and materials.

A loop 71 is provided on each bracket top horizontal flange 65. A hold-down strap 72 is positioned over the loop 71 and may be cinched down tight and locked by a clamp 73. A hook 74 is attached to one end of the hold-down strap 72 and is adapted for engaging an edge of the bumper bottom 61 (FIG. 6).

Figure 5:
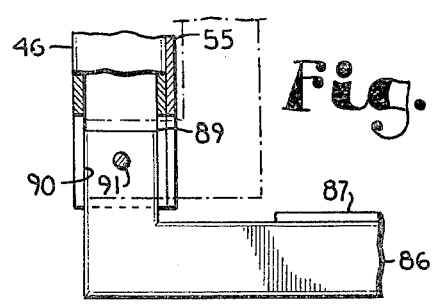
FIG. 5 is a fragmentary enlarged side elevational view of the pivotal connection of the load carrier as shown in FIG. 4 particularly showing a portion of the platform in an extended position thereof and showing a retracted position thereof in phantom.

A load carrying platform 81 includes a rectangular frame 83 comprised of inner and outer tubes 83 and 84 and right and left tubes 85 and 86 joined at their respective corners as shown in FIG. 2. A platform surface 87 adapted for supporting loads thereon is positioned on the rectangular frame 82. The platform surface 87 is preferably comprised of expanded sheet metal for lightweight strength to support heavy loads without undue deformation. However, it is anticipated that a variety of other materials such as solid plates or interwoven steel wires may be successfully employed in place thereof. A leg 89 extends from the forward ends of the right and left tubes 85 and 86 generally perpendicularly to the load carrying platform 81. Each leg 89 is received within a trunnion like lower end 90 of a respective right or left tube 45 and 46 and pivotally retained therein by a fastener such as by bolt 91 (FIG. 10). The load carrying platform 81 is thereby pivotable from an extended position with respect to the upright structure 44 to a retracted position adjacent and substantially parallel to the upright structure 44 (FIG. 5). The load carrying platform 81 is suspended in its extended position by a pair of chains 95 each attached to a respective right or left tube 45 and 46 by a connector 96 and to a respective right or left side tube 85 or 86 by a connector 97. In its extended position the load carrying platform 81 is thereby prevented by the chains 95 from pivoting downwardly below the desired horizontal position for supporting a load. Although chains 95 are shown, other support means such as cables may be employed. A latch 98 is attached to each respective right and left tube 45 and 46 and is adapted for engaging respective pins 99 attached to each of the right and left tubes of the rectangular frame 82. The load carrying platform 81 when empty may thereby be selectively secured in its retracted position. With the platform 81 thus retracted, the load carrier 1 does not significantly increase the effective length of the automobile 2. It will be appreciated that the retractability of the platform 81 represents a safety feature of the present invention.

In operation, the load carrier 1 is first attached to a vehicle such as the automobile 2 as shown. If necessary, the user may adjust the configuration of the load carrier 1 to accomodate his particular vehicle. For example, the plurality of longitudinal member apertures 27 allow the saddle structure 21 to be secured in an optimum position with respect to the automobile roof 3 without effecting the positioning of the upright structure 44 and load carrying platform 81 with respect to the automobile rear bumper 7. Similarly, the plurality of third transverse member apertures 69 allow repositioning of the right and left brackets 63 and 64 whereby the bumper attachment 51 can accomodate a variety of widths and configurations of automobile bumpers 7. The opposed ears 35 depending from the first transverse bar 22 form a pivotal connection with the studs 36 whereby the right and left roof engaging supports 33 and 34 may conform to a plurality of automobile roof curvatures. Similarly, the trunnion-like notches 48 at the tube upper ends 47 allow pivotal movement of the longitudinal members 11 and 12 with respect to the tubes 45 and 46. This feature allows the longitudinal members to assume whatever angular configuration with respect to the upright structure 44 is required to accomodate vehicles having different roof heights without altering the position of the upright structure 44 with respect to the rear bumper 7. The saddle structure hold-down straps 30, the forward hold-down strap 41 and the bumper attachment hold-down straps 72 are all self-adjusting to accomodate various vehicle designs when they are cinched down tight. The positioning of the bumper attachement 51 with respect to the load carrying platform 81 is shown as being fixed, however, it is anticipated that to accomodate unusual configurations this relationship could also be adjustable, as for example, by providing a plurality of apertures along the right and left tubes 45 and 46 to accommodate the mounting bolts 56 and 91. Also, the upright structure 44 and the load carrying platform 81 may be similarly mounted forward of an automobile front bumper as well as behind the rear bumper 7, as shown. The load carrier 1 is capable of supporting relatively heavy loads without interfering with the handling and driving characteristics of the automobile 2. However, for even heavier loads counterweights may be attached to a portion of the automobile 2 opposite an end from which the platform 81 extends. It will thus be appreciated that the present invention is readily adaptable to a variety of different vehicles. Such versatility makes the present invention particularly well suited for applications where the same load carrier 1 must be fitted to as many different types of vehicles as possible.

After any necessary adjustments have been made as described, the load carrier 1 is secured to the automobile 2 by cinching down the saddle structure hold-down straps 30, the forward hold-down strap 41 and the bumper attachment hold-down straps 72. The detachable load carrier 1 thereby presents a relatively rigid framework which is securely attached to the automobile 2. The load carrying platform 81 is then released from its retracted position by removing the latches 98 from their respective pins 99 and folding the load carrying platform 81 downwardly until it is supported by the chains 95. It will be appreciated that in such an extended position the platform 81 is substantially horizontal and relatively close to the ground or road surface. Most objects may therefore easily be placed upon the load carrying platform 81 with a minimum amount of effort. For example, many items may be loaded by tilting and sliding the item to place one portion thereof on the platform 81 and then tilting and sliding the rest of the object onto the platform 81. If necessary, the object to be transported on the load carrier 1 may be secured to the upright structure 44, for example, by using tying means (not shown) attached to the right and left tubes 45 and 46 or the second transverse bar 50 or the transverse bumper attachment member 52. Unloading may similarly be accomplished with the same ease and convenience. The empty load carrying platform 81 may then be folded upwardly to its retracted position adjacent to and substantially parallel with the upright structure 44 for using the automobile 2 with the empty load carrier 1 attached. In such retracted position the latches 98 engage their respective pins 99.

An additional load may be supported by the longitudinal members 11 and 12 which, because of their length and substantially horizontal position, are well suited for receiving a large, flat item such as a matress or a sheet of plywood. Also, the trunk lid 6 may be raised to provide access to the trunk space when the load carrier 1 is mounted.

The detachable load carrier 1 may be stored in a relatively small space after it is detached from the automobile 2. The right and left longitudinal members 11 and 12 may be removed from the saddle and upright structures 21 and 44. The load carrying platform 81 may then be folded to its retracted position as described. Thus partially disassembled, the detachable load carrier 1 may be conveniently stored for future use.

Figure 12:
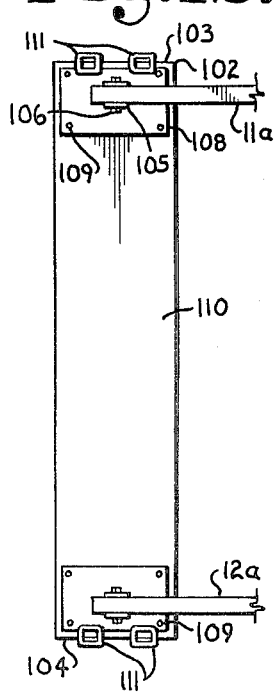
FIG. 12 is a fragmentary top plan view of the first modified embodiment of the load carrier particularly showing the saddle structure thereof.

The reference numeral 101 generally designates a first modified embodiment of the load carrier according to the present invention (FIGS. 11 and 12) having a modified saddle structure 102. Since the detachable load carrier 101 is otherwise substantially the same as the previously described device 1, similar parts appearing in FIGS. 11 and 12 and FIGS. 1 through 10 respectively, are represented by the same corresponding reference numeral except for the addition of the suffix "a" to the numerals of the modified embodiment. The saddle structure 102 includes right and left ends 103 and 104 each having a respective longitudinal member 12a or 13a attached in proximity thereto by means of a respective stud 105. Each stud 105 includes a trunnion-like end 106 with a bolt 107 positioned through the trunnion-like end 106 and longitudinal member apertures 27a to provide a means of attachment therebetween. Each stud is attached to and extends from a respective plate 108 which in turn is secured by fasteners such as the rivets 109 shown to a pad 110 positioned transversely with respect to the automobile roof 3a. A pair of loops 111 are attached to each respective plate 198 and are adapted for receiving hold-down straps 30a for securing the saddle structure 102 to the vehicle roof 3a. Each hold-down strap 30a includes a clamp 31a and a hook 32a for engaging a respective automobile roof gutter 5a.

In operation, the load carrier 101 of the first modified embodiment of the present invention functions in a similar manner to the first embodiment of the load carrier 1. However, the pad 110 provides a greater contact area with the vehicle roof 3a than do the roof engaging supports 33 and 34 of the previous structure. The pad 110 preferably comprises an elastomeric material such as reinforced rubber belting, which is sufficiently yieldable to conform to the vehicle roof 3a without marring or damaging the same yet is sufficiently strong to securely attach the load carrier 11 thereto. By providing two hold-down straps 30a on each saddle structure end 103 and 104 and a larger contact area, a substantial tensile force can be exerted across the pad 110 for increasing the pressure against the automobile roof 3a and the frictional force therebetween. With a saddle structure such as 102, the first transverse member 22 of the previous embodiment may be eliminated thereby simplifying construction of the first modified embodiment 101 of the present invention thereover.

While a pair of pads 40 for engaging the vehicle roof 3 and a single transverse pad 110 for engaging the roof 3a have been respectively shown in the primary and first modified embodiments of the present invention, it is anticipated that the roof engaging portion of the saddle structure may assume various other alternative configurations. For example, rubber suction cups could be successfully employed for providing a vacuum-like cohesion with a vehicle roof while also affording such a roof sufficient protection from damage or marring.

A second modified embodiment of a load carrier according to the present invention is generally designated by the reference numeral 121 in FIGS. 13 and 14. Similar parts appearing in FIGS. 13 and 14 and FIGS. 1 through 12 respectively which are otherwise substantially the same are represented by the same corresponding reference numeral except for the addition of the suffix "b" to the numerals of the modified embodiment. The second modified embodiment 121 of the present invention includes a single longitudinal member 122. A saddle structure 123 is positioned transversely with respect to the longitudinal member 122 and has a stud 105b with a trunnion end 106b within which the longitudinal member 12 is positioned by means of a bolt 17b. The stud 105b extends upwardly from a center plate 124 secured by rivets 109b to a resilient pad 110b. A pair of opposed plates 108b are secured to the resilient pad 110b by rivets 109b near each end 103b and 104b respectively of the saddle structure 123. Loops 111b are adapted for receiving hold-down straps 72b as with the first modified embodiment. The longitudinal member 122 is attached to an upright structure 125 in a similar manner to the previous embodiments with a pin 49b positioned through a trunnion-like end 48b to provide connection between the longitudinal member 122 and the upright structure 125. The saddle structure 123 is also pivotable with respect to the longitudinal member 122 about the bolt 107b. Because the longitudinal member 122 is pivotably connected at either end, the load carrier 121 is adaptable to vehicles having different roof heights. The pivotal connections enable the longitudinal member 122 to assume whatever angular relationship with respect to the saddle and upright structures 123 and 125 respectively is required to make such adaptation.

The upright structure 125 comprises right and left tubes 126 and 127 which together with the third transverse member 51b assume an "A" shaped configuration (FIG. 13). The bumper attachment 51b is similar to that of the previous embodiments and includes right and left brackets 63b and 64b with hold-down straps 72b. A load carrying platform 128b of the second modified embodiment is fixedly attached to the upright structure right and left tubes 126 and 127. Chains 95b suspend the load carrying platform 128 from the upright structure 125. Unlike the previous two embodiments, the load carrying platform of the second modified embodiment as shown is not foldable with respect to the upright structure 125, although it is conceivable that the necessary pivotal connections could be incorporated with such a configuration.

The load carrier 121 features simplified construction over the previous two embodiments. For example, only one longitudinal member 122 and one transverse member 52b are required. Also, the right and left tubes 126 and 127 are fixedly rather than pivotally attached to the platform 128.

In operation the load carrier 121 functions similar to the previous two embodiments except that suitable adjustments are made to the process of installing the load carrier 121 to account for the simpler design thereof and the load carrying platform 128 cannot be rotated into a stowed or travel position against the upright structure 125.

The reference numeral 131 generally designates a third modified embodiment of the load carrier according to the present invention (FIGS. 15, 16 and 17) having a modified bracket 132. Since the load carrier 131 is otherwise substantially the same as the previously described device 1, similar parts appearing in FIGS. 15 through 17 and FIGS. 1 through 14 respectively which are otherwise substantially the same are represented by the same corresponding reference numeral except for the addition of the suffix "c" to the numerals of the modified embodiment. The third modified embodiment 131 includes an alternative bracket 132 for attachment to a vehicle bumper 17c. The bracket 132 comprises a horizontal flange 133 and a vertical flange 134 attached thereto and depending therefrom. The horizontal flange 133 includes an inner end 135 with a pair of loops 136 attached thereto, each of the loops 136 defining an opening 137. The vertical flange 134 includes a pair of spaced outwardly extending portions 138 defining a channel-shaped configuration.

A strap 140 having a first and a second end 141 and 142 respectively is attached to the bracket 132 by means of a first hook 143 positioned in the opening 137 defined by a respective loop 136. The strap 140 includes a friction-type clamp 147 adjacent the first hook 143 at the strap first end 141 for adjusting the length of the strap 140. The strap second end 142 includes a second hook 144 attached thereto. A horizontal and a vertical pad 148 and 149 respectively are attached to the bracket horizontal and vertical flanges 133 and 134 respectively. The horizontal and the vertical pads 148 and 149 respectively comprise a resilient material and are adapted for engaging the bumper top and rear surfaces 59c and 60c respectively.

The bracket 132 is particularly well adapted for attaching a transverse bumper attachment member 52c to a variety of different vehicle bumpers such as that shown at 7c having different configurations. In operation, a pair of brackets 132 are attached to the transverse member 52c in transversely spaced relation by placing the transverse member 52c between the bracket outwardly extending portions 138 and attaching the brackets 132 by means of bolt connectors 68c. The horizontal and the vertical flanges 133 and 134 respectively are positioned adjacent the bumper top and rear surfaces 59c and 60c respectively. The horizontal and vertical pads 148 and 149 respectively engage the respective bumper surfaces 159 and 160 to prevent marring and scratching thereof. The strap second end 142 may then be attached to a bumper free edge 62c by means of the second hook 144 as shown in FIG. 16. Alternatively, if the bracket 132 is to be attached to a bumper 150 of a box-type construction without a free edge such as that shown at 62c, the strap 140 may partially encircle the bumper 150. The opening 137 of a respective loop 36 receives the second hook 144 attached to the strap second end 142. With the strap second end 142 thus attached according to one of the foregoing methods, the strap 140 is cinched down tight and retained at a predetermined length by the clamp 147, whereby the bracket 132 is tightly retained against the vehicle bumper 7c or 150.

It is to be understood that while certain forms of the present invention have been illustrated and described herein, it is not to be limited to the specific forms or arrangements of parts herein described and shown.

What is claimed and desired to secure by Letters Patent is:

1. A detachable load carrier for a vehicle, which comprises:
   (a) a longitudinal member positioned over and substantially lengthwise of said vehicle, said longitudinal member having a first and a second end portion;
   (b) an upright structure depending from said longitudinal member at an end of said vehicle, said upright structure having an upper end attached to said longitudinal member second end portion and a lower end below the level of a bumper of said vehicle;
   (c) a platform extending horizontally outwardly from said upright structure and said vehicle, said platform being attached to said upright structure lower end and adapted for receiving a load thereon;
   (d) first connector means for attaching said longitudinal member first end portion to a roof of said vehicle and resisting a portion of a force exerted on said carrier by said load; and
   (e) second connector means for attaching said upright structure to said bumper of said vehicle.

2. The load carrier as set forth in claim 1 wherein:

(a) said platform is pivotably connected to said upright structure, said platform being pivotable between a horizontally extended position for supporting a load thereon and a retracted position adjacent and substantially parallel with said upright structure.

3. The load carrier as set forth in claim 2 which includes:
(a) a flexible elongated member attached to said upright structure and said platform for suspending said platform in said extended position; and
(b) latch means connected to said upright structure and engagable with said platform for selectively retaining said platform in said retracted position.

4. The load carrier set forth in claim 1 which includes:
(a) said second connector means comprising a bracket attached to said upright structure between said upper and said lower ends thereof, said bracket including:
(1) a horizontal flange for engagement with a horizontal surface of said bumper;
(2) a vertical flange extending from said horizontal flange for engagement with a vertical surface of said bumper;
(3) a bumper hold-down strap having a first end and a second end;
(4) first attachment means for attaching said strap first end to said bracket; and
(5) second attachment means for attaching said strap second end to one of said bracket with said strap at least partially encircling said bumper and said bumper.

5. The load carrier as set forth in claim 4 which includes:
(a) said second attachment means comprising a hook attached to said strap second end and adapted for attachment to a free edge of said bumper; and
(b) a portion of said bracket defining an opening for selectively receiving said hook.

6. The load carrier as set forth in claim 5 which includes:
(a) said horizontal flange having inner end;
(b) said opening-defining portion being at said horizontal flange inner end; and
(c) a clamp positioned intermediate said strap first and second ends for adjusting the length of said strap whereby said bracket is tightly retained against said bumper.

7. The load carrier as set forth in claim 6 which includes:
(a) said upright structure having a transverse member extending substantially parallel to and outwardly of said bumper; and
(b) attachment means for attaching said bracket to said transverse member.

8. The load carrier as set forth in claim 7 which includes:
(a) said vertical flange comprising a channel with a pair of outwardly extending portions;
(b) said transverse member being positioned between said outwardly extending portions.

9. The bracket as set forth in claim 4 which includes:
(a) a horizontal pad attached to said horizontal flange for engaging said bumper horizontal surface;
(b) a vertical pad attached to said vertical flange for engaging said bumper vertical surface; and (c) said horizontal and said vertical pads comprising a resilient material.

10. A detachable load carrier for a vehicle having a bumper, which comprises:
(a) a pair of longitudinal members positioned over and substantially lengthwise of said vehicle, each of said longitudinal members having a first and a second end portion;
(b) a pair of hold-downs each attached to a respective longitudinal member first end and attachable to said vehicle;
(c) an upright structure including:
(1) a pair of upright members each having an upper end attached to a respective longitudinal member second end portion and a lower end below the level of said vehicle bumper; and
(2) a transverse bumper attachment member extending between and connected to said upright members;
(d) a pair of brackets each attached to said transverse bumper attachment member and adapted for attachment to said bumper, each of said brackets comprising:
(1) a horizontal flange for engagement with a horizontal surface of said bumper;
(2) a vertical flange extending from said horizontal flange for engagement with a vertical surface of said bumper;
(3) a bumper hold-down strap having a first end and a second end;
(4) first attachment means for attaching said strap first end to said bracket; and
(5) second attachment means for attaching said strap second end to one of said bracket with said strap at least partially encircling said bumper and said bumper; and
(e) a platform pivotably connected to said upright member lower ends, said platform being pivotable between a horizontally outwardly extended position for supporting a load thereon and a retracted position adjacent said upright structure while attached to said vehicle;
(f) said load on said platform exerting a torque force on said upright structure acting about a horizontal axis extending transversely with respect to said vehicle at said transverse bumper attachment member whereby said upright member upper ends are urged outwardly from said vehicle and said longitudinal members are subjected to a tensile force;
(g) said hold-downs being adapted for resisting said tensile force and preventing said longitudinal member first end portions from sliding longitudinally with respect to said vehicle.

11. The load carrier as set forth in claim 10 which includes:
(a) said upright structure being positioned outwardly of said bumper;
(b) said platform being positioned below said bumper in its horizontally extended position.

12. The load carrier as set forth in claim 10 which includes:
(a) each said vertical flange comprising a channel with a pair of vertically spaced outwardly extending portions;
(b) said transverse member being positioned between said outwardly extending portions.

13. The load carrier as set forth in claim 10 which includes:

(a) each of said brackets being attachable at a plurality of predetermined, longitudinally spaced positions along said transverse bumper attachment member; and (b) mounting means for mounting each said bracket to said transverse bumper attachment member at said positions therealong.

14. The load carrier as set forth in claim 10 which includes:

(a) a transverse bar having opposed ends and extending between said longitudinal member first end portions;

(b) a pair of sleeves each attached to a respective transverse bar end and slidably receiving a respective longitudinal member first end portion;

(c) locking means for fixedly attaching each said sleeve to a respective longitudinal member first end portion at a plurality of predetermined, longitudinally spaced positions along said longitudinal member first end portion; and (d) said hold-downs each comprising a strap attached to a respective sleeve and adapted for selectively engaging a roof structure of said vehicle.

15. A detachable load carrier for a vehicle having a roof structure and a bumper, which comprises:

(a) a pair of longitudinal members positioned over said roof structure and substantially lengthwise of said vehicle, each of said longitudinal members having a first and a second end portion;

(b) a transverse bar having opposed ends and extending between said longitudinal member first end portions;

(c) a pair of sleeves each attached to a respective transverse bar end and slidably receiving a respective longitudinal member first end portion;

(d) a pair of hold-down straps each attached to a respective sleeve and adapted for selectively engaging said roof structure;

(e) an upright structure including:

(1) a pair of upright members each having an upper end attached to a respective longitudinal member second end portion and a lower end below the level of said vehicle bumper; and (2) a transverse bumper attachment member extending between and connected to said upright members;

(f) a pair of brackets each attached to said transverse bumper attachment member and adapted for attaching to said bumper, each of said brackets comprising:

(1) a horizontal flange;

(2) a vertical flange connected to and depending from said horizontal flange, said vertical flange comprising a channel with a pair of vertically spaced outwardly extending portions with said transverse member positioned therebetween;

(3) a horizontal pad of resilient material attached to said horizontal flange for selectively engaging a horizontal surface of said bumper;

(4) a vertical pad of resilient material attached to said vertical flange for selectively engaging a vertical surface of said bumper;

(5) a bumper hold-down strap having a first end attached to said bracket and a second end with a hook for attachment to one of said bracket with said strap at least partially encircling said bumper and a free edge of said bumper;

(6) a clamp attached to said bumper hold-down strap for adjusting the length of said bumper hold-down strap whereby said bracket is tightly retained against said bumper;

(g) a platform pivotably connected to said upright member lower ends, said platform being pivotable between a horizontally outwardly extending position for supporting a load thereon and a retracted position adjacent said upright structure while attached to said vehicle;

(h) a flexible elongated member attached to said upright structure and said platforms for suspending said platform in said extended position; and (i) latch means connected to said upright structure and engageable with said platform for selectively retaining said platform in said retracted position;

(j) said load on said platform exerting a torque force on said upright structure acting about a horizontal axis extending transversely with respect to said vehicle at said transverse bumper attachment member whereby said upright member upper ends are urged outwardly from said vehicle and said longitudinal members are subjected to a tensile force;

(k) said hold-downs adapted for resisting said tensile force and preventing said longitudinal member first end portions from sliding longitudinally with respect to said vehicle.

* * * * *